(12) United States Patent
Schotten et al.

(10) Patent No.: US 7,426,197 B2
(45) Date of Patent: Sep. 16, 2008

(54) METHOD AND APPARATUS FOR LOCATION DETERMINATION OF A WIRELESS DEVICE WITHIN AN ENVIRONMENT

(75) Inventors: Hans Dieter Schotten, Nuremberg (DE); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 11/245,926

(22) Filed: Oct. 7, 2005

(65) Prior Publication Data

US 2006/0109811 A1 May 25, 2006

Related U.S. Application Data

(60) Provisional application No. 60/630,819, filed on Nov. 24, 2004.

(51) Int. Cl.
*H04Q 7/20* (2006.01)
*H04Q 7/36* (2006.01)

(52) U.S. Cl. .................. 370/328; 370/338; 370/310; 370/313; 455/456.1; 455/456.3; 455/456.6; 455/414.1; 455/414.2; 340/539.1; 340/568.2; 340/568.8; 340/572.1; 340/572.2

(58) Field of Classification Search ...... 455/456.1–457, 455/422.1, 426.1, 426.2, 403, 445, 500, 517, 455/550.1, 418, 419, 420, 412.1, 412.2, 414.2, 455/414.3, 73, 557, 404.1, 404.2, 575.1, 455/90.1, 90.3; 370/328, 338, 310, 313; 340/539, 568.2, 568.8, 572.1, 572.3, 572.8, 340/572.4, 425.36, 286.07, 286.09

See application file for complete search history.

(56) References Cited

U.S. PATENT DOCUMENTS

| | | | | |
|---|---|---|---|---|
| 2004/0157625 | A1* | 8/2004 | Gheorghiu et al. | 455/456.2 |
| 2004/0203944 | A1 | 10/2004 | Huomo et al. | |
| 2005/0245271 | A1* | 11/2005 | Vesuna | 455/456.1 |
| 2006/0063563 | A1* | 3/2006 | Kaufman | 455/556.2 |

FOREIGN PATENT DOCUMENTS

| | | |
|---|---|---|
| EP | 1313079 | 5/2003 |
| WO | 9955102 | 10/1999 |
| WO | 2004040923 | 5/2004 |
| WO | 2004057361 | 7/2004 |

\* cited by examiner

*Primary Examiner*—Keith T. Ferguson
(74) *Attorney, Agent, or Firm*—William Marcus Hooks; Thomas R. Rouse

(57) ABSTRACT

A method and apparatus for determining a location of a wireless device within an environment. A wireless device, which is operable in a wireless communication system, comprises a transmitter for transmitting a first signal to a transponder, where the transponder operates independent of the wireless communication system. The wireless device further includes a receiver for receiving a second signal from the transponder, where the second signal includes identifying data associated with the transponder. The wireless device further includes a processor for determining a location of the wireless device within the environment or classifying the environment based at least in part upon the received identifying data.

33 Claims, 5 Drawing Sheets

| Transponder ID | Location Information | Context Information | Control Information |
|---|---|---|---|
| 01050236 | Bldg 1, Flr 2, Rm 36 Conference | Meeting Agenda mm/dd/yy hh:mm | Silent Mode |
| 01030237 | Bldg 1, Flr 2, Rm 37 Office | None | Transfer to Landline Phone |
| ... | ... | ... | ... |

FIG. 3

METHOD AND APPARATUS FOR LOCATION DETERMINATION OF A WIRELESS DEVICE WITHIN AN ENVIRONMENT

CLAIM OF PRIORITY UNDER 35 U.S.C. §119

This application claims priority to U.S. Provisional Application No. 60/630,819 filed Nov. 24, 2004, entitled "A Position Determining System Using Passive Transponders," and assigned to the assignee hereof and hereby expressly incorporated by reference herein.

BACKGROUND

1. Field

The present invention relates generally to the field of communication, and more specifically, to a method and apparatus for determining a location or classifying the environment of a wireless device.

2. Background

Wireless communication technologies have seen explosive growth over the past several years. This growth has been primarily fueled by wireless services providing freedom of movement to the communicating public as opposed to being "tethered" to a hard-wired communication system. It has further been fueled by the increasing quality and speed of voice and data communications over the wireless medium, among other factors. As a result of these enhancements in the communications field, wireless communications has had, and will continue to have, a significant impact on a growing number of the communicating public.

Because a wireless communication device (e.g., a wireless telephone) is mobile, it may be desirable to determine its location within a given environment for various reasons. A Global Positioning System (GPS) is a well-known technology for providing location information to a mobile device (e.g., a GPS receiver). GPS provides coded signals that are transmitted from a satellite system to the GPS receiver, which translates these coded signals to provide a location of the receiver.

Although GPS receivers may provide location information, they suffer from several drawbacks. GPS receivers can be relatively costly, and the incorporation of such a receiver within a wireless phone, for example, can significantly increase its cost. Additionally, the circuitry of a GPS receiver incorporated in a wireless phone may undesirably increase the dimensions of the phone, thereby making the phone less compact, heavier, and more cumbersome to carry by individuals. More significantly, however, GPS satellite signals cannot typically be received within enclosed spaces, such as within an office building, for example. As a result, location determination of the wireless phone within these enclosed spaces is significantly impacted if not determinable at all.

The present invention is directed to overcoming, or at least reducing the effects of, one or more problems indicated above.

SUMMARY

In one embodiment, a method for a wireless device operable in a wireless communication system is provided. The method comprises transmitting a first signal to a transponder, where the transponder operates independent of the wireless communication system. A second signal is received from the transponder, where the second signal includes identifying data associated with the transponder. A location of the wireless device is determined within an environment or the environment is classified based at least in part upon the received identifying data.

In another embodiment, an apparatus for a wireless device operable in a wireless communication system is provided. The apparatus comprises means for transmitting a first signal to a transponder, where the transponder operates independent of the wireless communication system. A second signal is received from the transponder, where the second signal includes identifying data associated with the transponder. A location of the wireless device is determined within an environment or the environment is classified based at least in part upon the received identifying data.

In another embodiment, a wireless device operable in a wireless communication system is provided. The wireless device comprises a transmitter for transmitting a first signal to a transponder, where the transponder operates independent of the wireless communication system. A receiver receives a second signal from the transponder, where the second signal includes identifying data associated with the transponder. The wireless device further includes a processor for determining a location of the wireless device within an environment or classifying the environment based at least in part upon the received identifying data.

In another embodiment, a computer-readable storage medium programmed with a set of instructions that are executable by a processor to perform a method is provided. A first signal is transmitted from a wireless device operable in a wireless communication system to a transponder, where the transponder operates independent of the wireless communication system. A second signal is received at the wireless device from the transponder, where the second signal includes identifying data associated with the transponder. A location of the wireless device is determined within an environment or the environment is classified based at least in part upon the received identifying data.

BRIEF DESCRIPTION OF THE DRAWINGS

FIG. 3 provides a location database for storage within a memory of the wireless device according to one embodiment.

DETAILED DESCRIPTION

Figure 1A:
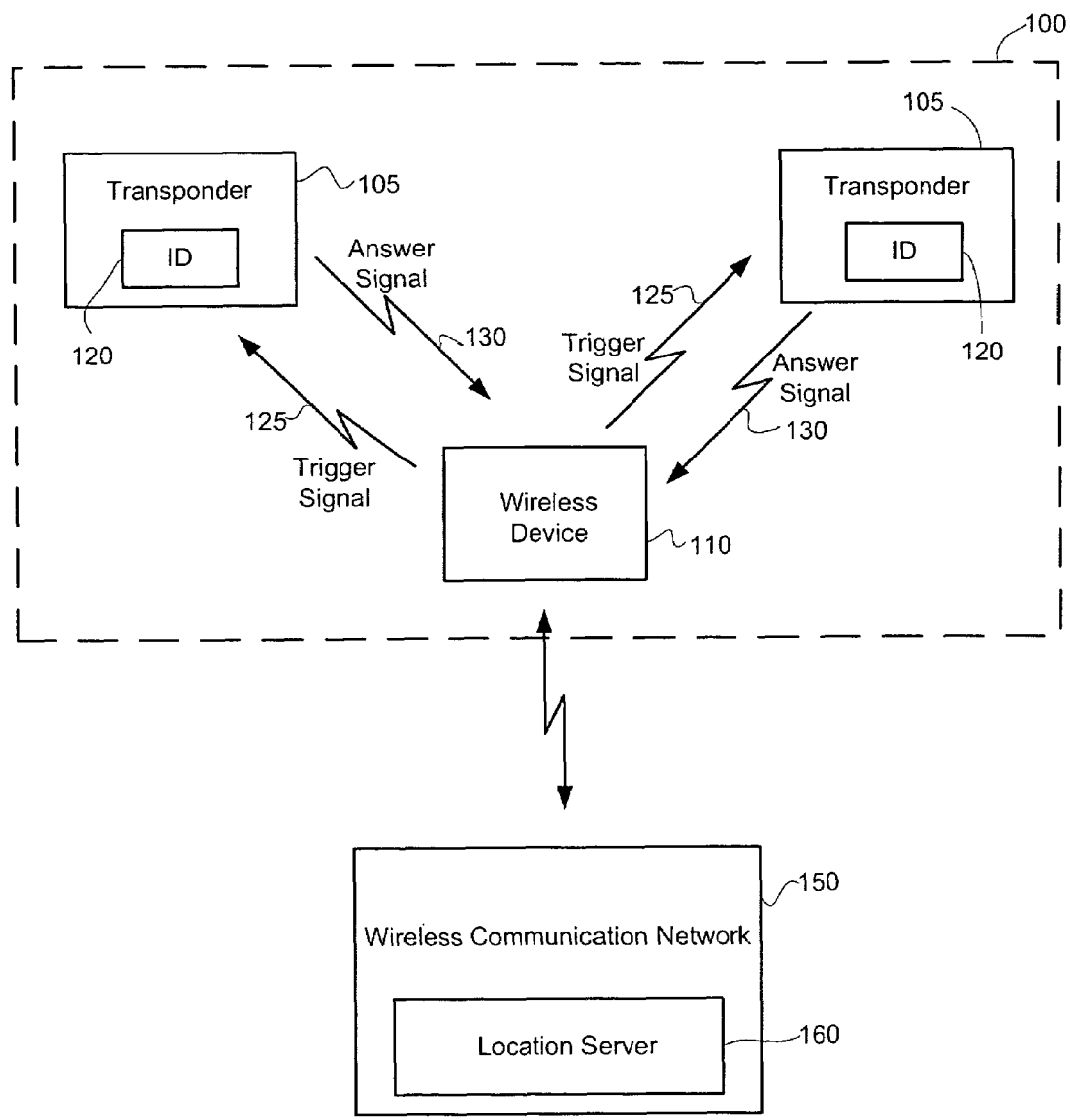
FIG. 1A illustrates a location system for determining a location of a wireless device within a given environment according to one embodiment.

FIG. 1A provides a simplified illustration of a system 100 for determining a location of a wireless device 110 within a given environment in accordance with one exemplary embodiment. The system 100 comprises a plurality of transponders 105 that are deployed within the environment and one or more wireless devices 110 that communicate therein. In accordance with one embodiment illustrated in FIG. 1B, the environment may take the form of a building 115 (such as an office building, for example) and the system 100 may determine the location of the wireless device 110 within the building 115. It will be appreciated that the given environment in which the system 100 is deployed need not necessarily be limited to the aforementioned example of an office building. For instance, other examples of an environment where the system 100 may be implemented include an airport, shopping mall, train station, hotel, restaurant, conference center, theater, etc. or any other enclosed or unenclosed area having either public or private access by individuals.

The wireless device 110 may, for example, take the form of a wireless telephone, personal information manager (PIM), personal digital assistant (PDA), laptop computer, or various other types of devices that are configured for wireless communication. In addition to communicating with the transponders 105, the wireless device 110 may also communicate with a wireless communication network 150 (as shown in FIG. 1A). The wireless communication network 150 may provide voice and/or data communication services to the wireless device 110 on a subscription basis, for example. The wireless device 110 may communicate with the wireless communication network 150 in accordance with one of several different communication protocols including, but not necessarily limited to, Code Division Multiple Access (CDMA), Wideband-CDMA (W-CDMA), Time Division Multiple Access (TDMA), Frequency Division Multiple Access (FDMA), Global System for Mobile communications (GSM), Orthogonal Frequency Division Multiplexing (OFDM) or any other known wireless communication multiple access schemes or standards.

Figure 1B:
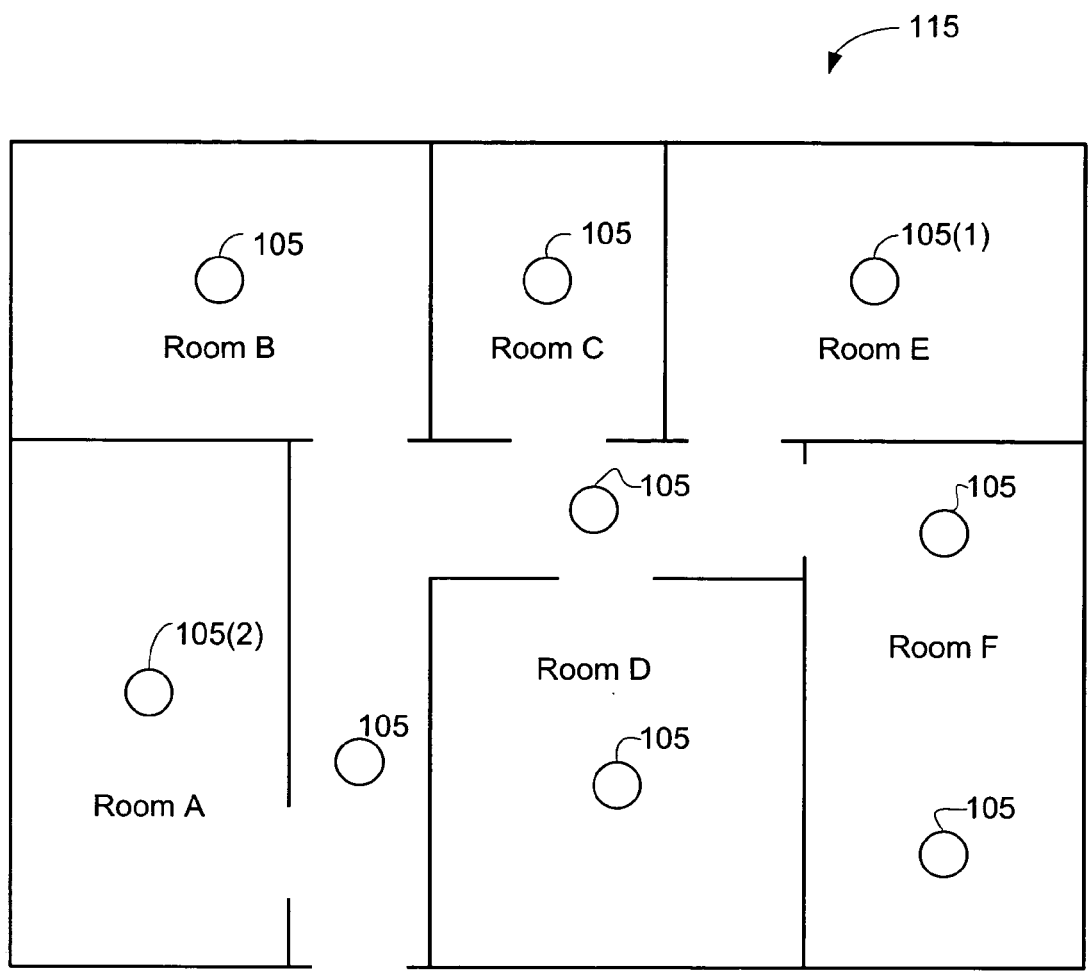
FIG. 1B shows an example of an environment in which the location system of FIG. 1A may be used.

The transponders 105 of the location system 100 may be installed by the owner of the particular environment in which it is used, such as the owner of the office building 115 illustrated in FIG. 1B, for example. In one embodiment, the location system 100 may operate independent of the wireless communication network 150 for determining the location of the wireless device 110; however, it will be appreciated that the location system 100 may also operate in conjunction with the wireless communication network 150. For example, the location of the wireless device 110 may be communicated to a location server 160 of the wireless communication network 150, and the network 150 may use this location information in its interaction with the wireless device 110. In one embodiment, the level of cooperation between the location system 100 and the wireless communication network 150 may be selectively controlled by the user of the wireless device 110. It will also be appreciated that the level of cooperation between the location system 100 and the wireless communication network 150 may also be controlled by the operator of the location system 100 or the wireless communication network 150. The operation of the location system 100 and its interaction with the wireless communication network 150, if any, will be further appreciated as the detailed description proceeds.

In accordance with one embodiment, the transponders 105 take the form of passive transponders, such as Radio Frequency Identification Devices (RFIDs), for example. Each transponder 105 has a transponder address or identification (ID) 120 associated therewith for uniquely identifying one transponder 105 from another. The transponders 105 in this particular embodiment are "passive" in the sense that they do not have a power supply. The use of passive transponders enables the deployment of these devices within a particular environment at a relatively low cost. Additionally, the use of passive transponders can provide privacy to the user of the wireless device 110 since they do not identify the wireless device 110. Accordingly, the user of the wireless device 110 may control whether or not to provide his or her location information to the wireless communication network 150, for example, or some other network entity.

In an alternative embodiment, the transponders 105 may be implemented as active transponders (i.e., transponders having a power supply) or wireless access points either in addition to or in lieu of the passive transponders discussed above. Additionally, it will be appreciated that the communication protocol used between the wireless device 110 and the transponders 105 may include, but need not necessarily be limited to, Bluetooth®, Ultra-Wideband (UWB) or other related wireless technologies. Furthermore, communication between the transponders 105 and the wireless device 110 need not necessarily be limited to radio frequency (RF) communication, but may include various other forms of wireless communication, such as infrared (IR) communication, for example.

The transponders 105 may be attached to parts of the structure forming the environment, such as the walls, floors, or ceiling of a building, for example. As shown in the example illustrated in FIG. 1B, the transponders 105 are disposed in rooms A-F of the building 115. It will be appreciated that the more transponders 105 that are deployed within the given environment, the more accurate the location of the wireless device 110 may be ascertained within that environment. Furthermore, the number of transponders 105 used and their particular configuration within the environment may vary as a matter of design and need not necessarily be limited to the example shown in FIG. 1B.

As shown in FIG. 1A, the wireless device 110 transmits a trigger signal 125 that is received by a passive transponder 105 within proximity to the wireless device 110. Upon receiving the trigger signal 125, the passive transponder 105 sends an answer signal 130 that includes the identification 120 associated therewith to the wireless device 110. In this particular embodiment, the passive transponder 105 utilizes the energy of the incoming trigger signal 125 to transmit the answer signal 130 to provide its identification 120 to the wireless device 110. The trigger signal 125 may be sent by the wireless device 110 either by:

a request of the wireless device's user via an input to the wireless device 110;

periodic transmission of the trigger signal 125 with the time period for transmission defined by the user, the wireless communication network 150, or information received or stored at the wireless device 110;

a request by the wireless communication network 150 with which the wireless device 110 communicates; or information either derived from or provided by the transponder 105.

The wireless device 110, upon receiving the answer signal 130, may then ascertain its location or position within the given environment by cross-referencing the identification 120 of the transponder 105 to location information stored in a database within its memory, for example. Referring to the example provided in FIG. 1B, the wireless device 110 may enter into room "E" of building 115, for example. The wireless device 110 transmits a trigger signal 125 and the transponder 105(1)(disposed within room E) sends an answer signal 130 that includes its transponder identification 120. Upon receiving the answer signal 130, the wireless device 110 may refer to a location database within its memory to determine the location of the wireless device 110 based on the transponder's identification 120. The format of the location information may vary depending on the context of the environment in which the wireless device 110 is present. For the example shown in FIG. 1B, the format of the location information may indicate the room number in which the wireless device 110 is located. The location information may include other information, such as the building number if the system 100 is deployed in a multi-building complex, a floor number, a section or wing number to identify a particular part of the building, or any combination thereof. The location information may also vary in specificity for characterizing the location within the environment. For example, the location information may specify a room type such as a conference room, for example. It will be appreciated that the aforementioned examples of the various formats of location information was provided in the context of the office building illustrated in FIG. 1B. Accordingly, the location information may be provided in various other formats, such as geographical coordinates (e.g., latitudinal and longitudinal coordinates) or any other format that may be used to effectively characterize a location of the wireless device 110 depending on the context of the environment in which the location system 100 is utilized.

Figure 2:
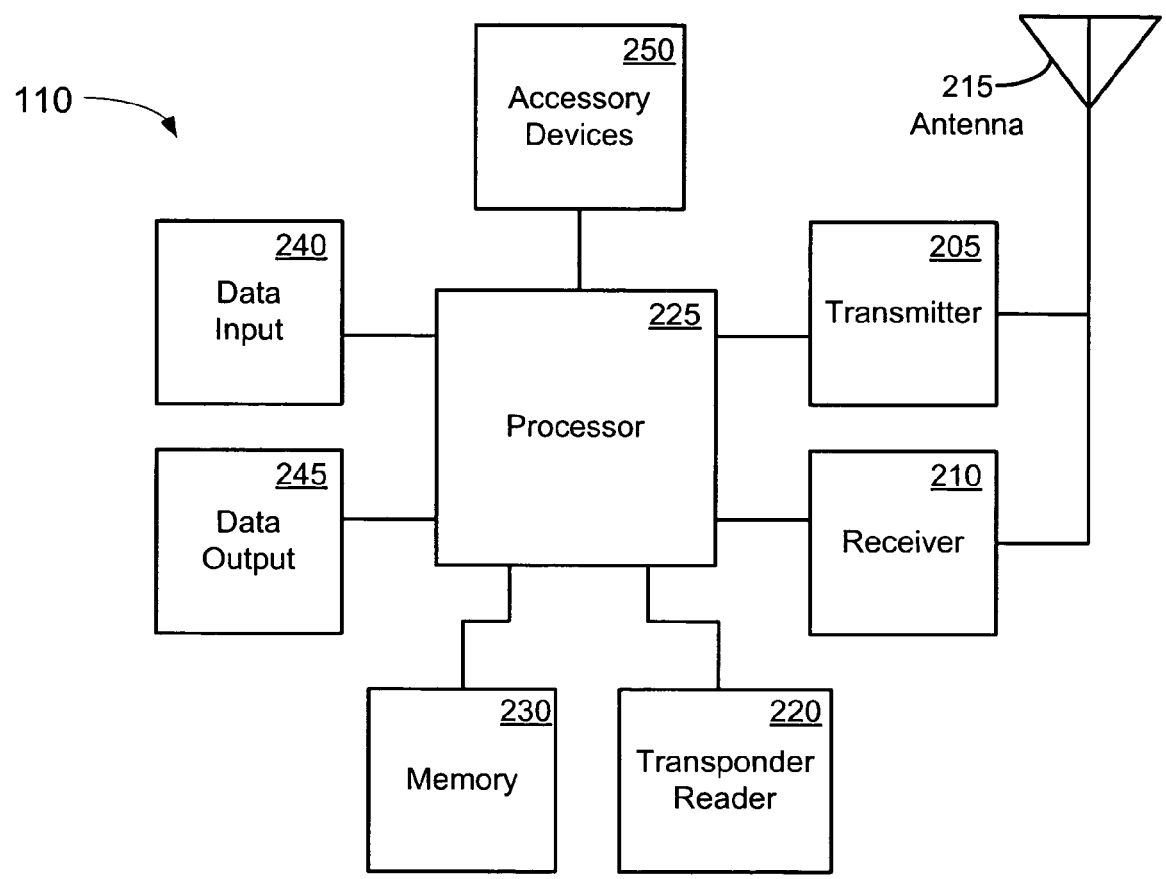
FIG. 2 provides a more detailed representation of the wireless device of FIG. 1A according to one embodiment.

Referring to FIG. 2, a more detailed representation of the wireless device 110 is shown in accordance with one embodiment. In one of its simpler forms, the wireless device 110 comprises a transmitter 205 and a receiver 210 for respectively transmitting and receiving signals with the wireless communication network 150. The transmitter 205 and receiver 210 may also be combined into a single transceiver unit as opposed to being embodied as two separate entities as illustrated in FIG. 2. The transmitter 205 and receiver 210 are coupled to an antenna 215 to facilitate the wireless transmission and reception of these signals with the wireless communication network 150 in accordance with the particular wireless communication protocol utilized by the network 150.

The wireless device 110 further comprises a processor 225 for controlling various operating functions thereof and a memory 230 for storing data. In one embodiment, the processor 225 may take the form of a digital signal processor (DSP) chip; however, it will be appreciated that the processor 225 may take the form of various other commercially-available processors or controllers.

The wireless device 110 also comprises a data input 240 to provide data for storage within the memory 230 of the wireless device 110 and/or for the transmission of data to the wireless communication network 150, for example. The data input 240 may take the form of a microphone, keypad, keyboard, touchscreen display or an input from a data generating device (e.g., a computer) or any combination thereof. It will be appreciated that the data input 240 may be implemented in various other forms to provide data to the processor 225 and need not necessarily be limited to the aforementioned examples.

The data received through the data input 240 is processed by the processor 225 and may be forwarded to either the memory 230 for storage therein or to the transmitter 205 for transmission thereby. Data received by the receiver 210 is forwarded to the processor 225 for processing and then may be sent to either the memory 230 for storage therein or to data output 245 for presentation to the user of the wireless device 110, for example. The data output 245 may take the form of a speaker, visual display, or an output to a data device (e.g., a computer) or any combination thereof. It will be appreciated that the data output 245 may comprise various other types of devices and need not necessarily be limited to the aforementioned examples.

The wireless device 110 may also be configured with accessory devices 250, which may include, but need not necessarily be limited to, a camera, bar code reader, infrared (IR) communication device, or various other types of devices for performing various operating functions. It will be appreciated that these accessory devices 250 may be included as an integral component of the wireless device 110 or may alternatively be configured as a separate unit that may be attachable and detachable with the wireless device 110. The simplified depiction of the wireless device 110 illustrated in FIG. 2 is merely for ease in conveying the foregoing embodiments. Accordingly, it will be appreciated that the wireless device 110 may include other components to enable various other features and/or capabilities of the device 110 than those illustrated.

In accordance with the illustrated embodiment, the wireless device 110 is configured with a transponder reader 220 for communicating with the transponders 105 over a wireless communication medium. The transponder reader 220 may be configured as an integral component of the wireless device 110 or may alternatively take the form of a separate device that may be attachable/detachable with the wireless device 110. In one embodiment, the transponder reader 220 is configured to communicate with the passive transponders 105 configured as RFID devices as previously discussed. The transponder reader 220 transmits the trigger signal 125 to the passive transponder 105 and receives the answer signal 130 that includes the identification 120 of the passive transponder 105 over a radio frequency (RF) link. In an alternative embodiment, the transponder reader 220 may be configured to communicate with active transponders via Bluetooth® or Ultra-Wideband (UWB) wireless communication protocols, for example, or wireless local area network (WLAN) access points for obtaining the location information. Additionally, communication between the transponders 105 and the transponder reader 220 of the wireless device 110 need not necessarily be limited to RF communication, but may include various other forms of wireless communication, such as infrared (IR) communication, for example.

In an alternative embodiment, the transmitter 205 and receiver 210 of the wireless device 110 may be used either in lieu of or in addition to the transponder reader 220 for communicating with the transponders 105 providing that the wireless communication protocol used by the transmitter 205 and receiver 210 is compatible with the communication protocol used by the transponders 105. In yet another embodiment, the identifying data associated with a particular location may be provided to the wireless device 110 in an alternative form than in the form of the transponder 105 transmitting the identification 120 as previously described. For example, a bar code strip attached to the structure may be used to provide data identifying its location within the environment to the wireless device 110. In this particular embodiment, the wireless device 110 may be configured with a barcode reader for reading the barcode strip to obtain the location information. In another embodiment, the bar code strip could be captured by a camera on the wireless device 110 and interpreted by the processor 225 to obtain the location identifying data thereof. It will be appreciated that various other types or forms of technology for providing the location identifying data to the wireless device 110 may be used either in lieu of or in addition to the aforementioned examples.

After the transponder reader 220 of the wireless device 110 receives the answer signal 130 that includes the identification 120 of the most proximate transponder 105, the processor 225 accesses a location database within memory 230 to determine the location of the wireless device 110 within the environment based upon the transponder's identification 120.

FIG. 3 provides an example of a location database 300 that may be stored in the memory 230 of the wireless device 110 in accordance with one embodiment. The location database 300 may include a transponder identification field 305 that includes the respective identifications 120 of the transponders 105 within the location system 100. A location information field 310 corresponds to each transponder identification field 305 for providing the location or address of where the corresponding transponder 105 is located within the particular environment. As previously mentioned, the location information 310 may be provided in various forms depending on the context in which the location system 100 is used. For instance, in the example of FIG. 1B, the location information 310 may indicate the room number in which the transponder 105 is located. Additionally, the location information 310 may include other information, such as the building number, a floor number, a section or wing identifier for identifying a particular part of the building, a particular room type or category, or any other identifying information that characterizes the particular location of the corresponding transponder 105. Additionally, it will be appreciated that the examples of the various formats characterizing the location of the transponder 105 and wireless device 110 may include other data either in addition to or in lieu of the aforementioned examples. For instance, the location information 310 may be provided in geographical coordinates (e.g., latitudinal and longitudinal coordinates), a street address, or any other format that may effectively characterize a location of a particular transponder 105 depending on the context of the environment in which the system 100 is utilized.

In another embodiment, portions of the transponder identification 120 may indicate or represent the location address, type of location, or other data associated with the location of the transponder 105 with which the wireless device 110 communicates. For example, considering the transponder identification "01050236" within the location database 300, the digits "01" may indicate that the transponder 105 is located in building 1 of a multi-building complex, the digits "05" may indicate the type of room (e.g., a conference room), "02" may indicate the floor number (e.g., $2^{nd}$ floor of the building), and "36" may indicate the actual room number. It will be appreciated that the transponder identifications 120 need not necessarily be limited to the particular format shown in the example of FIG. 3. Should the identification 120 of the transponder 105 be provided in "location coded" form to provide the actual location information within the identification 120 (as described above), the wireless device 110 may then be configured not to access the location database 300 to obtain the location of the transponder 105 or even to store the database 300 in its memory 230, thus conserving memory space of the wireless device 110.

The transponder 105 may also transmit information to the wireless device 110 that identifies the location (as opposed to the transponder identification 120 itself or a "location coded" identification) or provides information or one or more parameters characterizing the environment or location where the wireless device 110 is present. For example, instead of transmitting the transponder identification 120 in the answer signal 130 to the wireless device 110, the transponder 105 may send a location parameter that indicates that the wireless device 110 is located in a conference room, hospital, airplane, or theater, for example. As mentioned, it will be appreciated that the specificity of the location information provided by the transponder 105 may vary. For example, the location information transmitted from the transponder 105 may be as general as to the type of environment, such as a conference room, for example, or may be more specific such as identifying actual geographical coordinates, a street address, or a particular room number.

The location database 300 may also be configured with a context information field 315, which provides information relevant to the particular location of the transponder 105 that is communicating with the wireless device 110. For example, if the transponder 105 is located within a conference room, the context information field 315 may direct the wireless device 110 to display information such as a meeting agenda for a meeting being held in the conference room at a particular time. It will be appreciated that the context information 315 provided within the database 300 may vary depending on the context of the environment in which the location system 100 is used. For example, if the transponder 105 is located in a theater, the context information 315 field may direct the wireless device 110 to display information regarding a performance within the theater, such as a synopsis of the various acts in a play, the actor's names, etc. If the transponder 105 is located within a restaurant, the context information field 315 may direct the wireless device 110 to display information such as a menu of the restaurant, a listing of the restaurant's daily specials, etc. If the transponder 105 is located in a laboratory, for example, the context information 315 associated with the transponder identification 120 may be to alert the user of the wireless device 110 to wear safety goggles in that particular area of the laboratory where the transponder 105 is located, or to caution the user that he or she may be exposed to certain chemicals or gases in a certain area of the laboratory that may be harmful. As mentioned, it will be appreciated that the context information field 315 may include various other types of information to provide to the user of the wireless device 110 that is relevant to the context of the environment in which the location system 100 is used, and thus need not necessarily be limited to the aforementioned examples. Additionally, the context information field 315 may include an address, pointer, link or some other information to permit the wireless device 110 to obtain the context information from an external source. For instance, in the example of the meeting agenda, the agenda might be retrieved by the wireless device 110 accessing the company's intranet through a link provided in the context information field 315.

The location database 300 may also be configured with a control information field 320, which may provide commands to control various operating functions of the wireless device 110 based on its location. For instance, if the transponder 105 is located within a conference room, the control information field 320 corresponding to that transponder 105 may be to have the wireless device 110 switch one or more operating modes, such as switching the wireless device 110 from a "ring" mode to a "vibrate" mode, for example. In another example, if the transponder 105 is located at the entrance of a hospital, the control information 320 corresponding to that transponder 105 may be to switch off the transmitter 205 of the wireless device 110 so as not to interfere with various medical devices (e.g., pacemakers) present within the hospital. In an office environment, where a transponder 105 detects that the user of the wireless device 110 is present within their own office, a control signal could be transmitted to the location server 160 of the wireless communication network 150 to have all incoming calls directed to the wireless device 110 forwarded to the user's landline office phone. In this particular example, the transponder 105 located within the user's office may send a control parameter to have the wireless device 110 transmit a trigger signal 125 every five or ten minutes, and to have the wireless device 110 transmit a cancel forwarded call signal to the wireless network 150 when the transponder's identification 120 is no longer received at the wireless device 110.

Some examples of actions that may be performed by the wireless device 110 in response to the control information 320 include:

switching between different operating modes or profiles of the wireless device 110;

switching off the ringer (e.g., if a parameter is received from the transponder 105 or derived from the identification received from the transponder 105 indicates to the wireless device 110 that it is in a restaurant, conference room, theatre or any other "ringer-off" environment);

switching off some or all of the radio modems of the wireless device 110 (e.g., if the location parameter is "in airplane" or "in hospital" is received);

switching between different activity modes of the transmitter sending out the trigger signal 125 (e.g., only to read the transponders 105 every x minutes, or not at all or only when requested by the device user); and forwarding of all received calls to a certain phone (e.g., if location parameter="in my office").

It will be appreciated that this list is not exhaustive and that the control information 320 provided to the wireless device 110 need not necessarily be limited to the aforementioned examples, but may include several others depending on the context of the environment.

The location database 300 may be downloaded to the wireless device 110 from various sources through either a wired or wireless communication medium. In one embodiment, the location database 300 may be downloaded to the wireless device 110 from the internet through the wireless communication network 150. For example, the operator of the location system 100 may provide a website via the internet that provides the location, context, and/or control information that corresponds to each of the transponders 105 within the location system 100. In the example of FIG. 1B, the operator of the location system 100 could be the owner of the building 115 or the company that occupies the office space. In an alternative embodiment, the location database 300 may be stored at the location server 160 within the wireless communication network 150. In this particular embodiment, the wireless device 110, upon receiving the answer signal 130 from the transponder 105, may forward the corresponding transponder identification 120 to the location server 160 at the wireless communication network 150, which may then provide the relevant location, context, and/or control information to the wireless device 110. In one embodiment, the owner of the location system 100 may maintain the database 300 within the location sever 160 on a subscription basis, for example.

Figure 4:
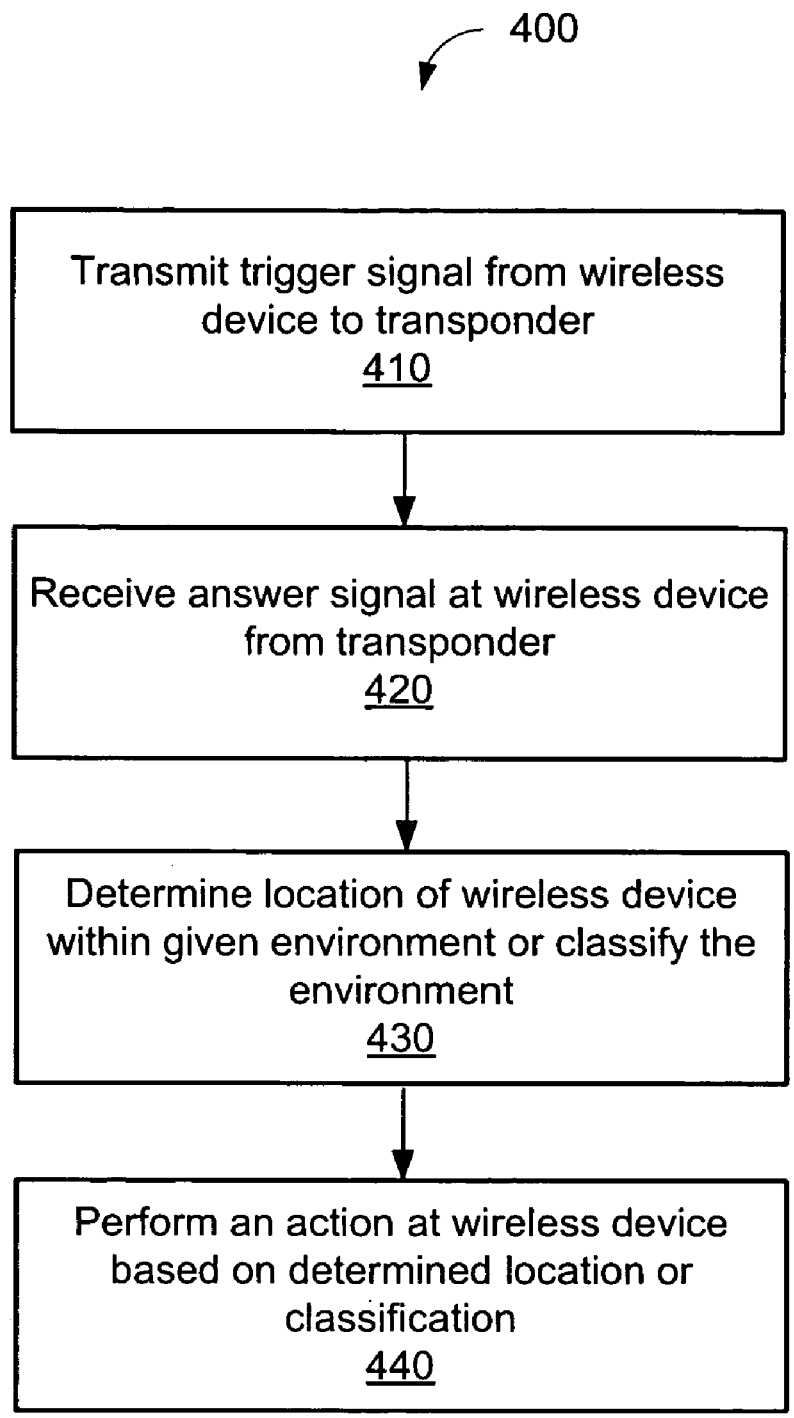
FIG. 4 is a flowchart illustrating a process for determining a location of the wireless device according to one embodiment.

FIG. 4 provides a flowchart illustrating a process 400 for determining a location of the wireless device 110 within a particular environment in which the location system 100 is used. The process 400 commences at block 410, where the wireless device 110 transmits a trigger signal 125 to a transponder 105 within proximity of the wireless device 110. In accordance with one embodiment, the wireless device 110 may be configured to transmit the trigger signal 125 periodically, such as every five minutes, for example. It will be appreciated, however, that the frequency of transmitting the trigger signal 125 may vary and need not necessarily be limited by the aforementioned example. Furthermore, the frequency of transmitting the trigger signal 125 may be provided by the user of the wireless device 110, a transponder 105 within the location system 100, the wireless communication network 150, or some other network entity. Alternatively, the transmission of the trigger signal 125 may be manually controlled by the user of the wireless device 110, such as actuating a button when entering into a room, for example.

At block 420, the transponder 105 receiving the trigger signal 125 transmits an answer signal 130 that includes the identification 120 of the transponder 105 to the wireless device 110. If the transponder reader 220 of the wireless device 110 receives two or more answer signals 130 from different transponders 105 in response to the transmitted trigger signal 125, the wireless device 110 may be configured to determine which of the plurality of answer signals 130 had the highest received signal strength for determining which of the transponders 105 it is most closely located. It will be appreciated that other well known methodologies may be employed for determining to which of the transponders 105 the wireless device 110 is more closely located should the device 110 receive multiple answer signals 130.

The answer signal 130 transmitted from the transponder 105 may include actual location information (e.g., a room type, room number, etc.) in lieu of or in addition to the transponder identification 120, or may include one or more control parameters (e.g., switching operation modes, adjusting the frequency of trigger signal transmission, etc.) for controlling the wireless device 110. Additionally, the transponder identification 120 itself may be location-coded (as previously discussed) to provide location information to the wireless device 110 within the identification 120 itself.

At block 430, upon receiving the answer signal 130, the processor 225 determines the location of the wireless device 110 within the given environment or provides a classification thereof. In one embodiment, the processor 225 may access memory 230 to look up the corresponding transponder identification 120 within the location database 300 to obtain the location or classification thereof that is provided in location information field 310. In another embodiment, the location database 300 may be stored within the location server 160 of the wireless communication network 150, and the processor 225 may direct the wireless device 110 to access the location information 310 by contacting the location server 160. In another embodiment, the answer signal 130 may include the actual location or classification information of the transponder 105, such as providing a location-coded identification 120, for example. In this particular embodiment, the processor 225 would not need to access the database 300 to determine the location of the wireless device 110 or the classification of the environment. In yet another embodiment, the transponder 105 may transmit a location or classification parameter in the answer signal 130 to the wireless device 110. The location or classification parameter, for example, could indicate a type of establishment or environment (e.g., hospital, airplane, XYZ company, restaurant, etc.), a type of room (e.g., conference room, office, file room, lobby, etc.) within a building, an actual room number, wing or floor of a building, street address, geographical coordinates, or any other type of location or classification descriptor that may effectively characterize the location of the wireless device 110 depending on the context of the environment in which the location system 100 is used. It will also be appreciated from the aforementioned examples that the specificity of the location or classification information may vary from being as general as identifying a type of establishment or environment (e.g., hospital, airplane, etc.) to as specific as identifying a room number, part or section of a room, geographical coordinates, etc.

At block 440, the wireless device 110 may perform an action based upon the location or classification information obtained. For example, the wireless device 110 may display the actual location information to the user, display context information to the user according to the content provided in the context information field 315 of the database 300, or perform a control function based upon the content provided within the control information field 320 of the database 300.

The wireless device 110 may also transmit a location signal to the location server 160 of the wireless communication network 150 to register its current location. In an alternative embodiment, the wireless device 110 may perform an action based upon receiving a control parameter directly from the transponder 105. For example, the transponder 105 may send a control parameter in the answer signal 130 to have the wireless device 110 turn off its transmitter when present in an airplane, hospital, etc. Alternatively, the control parameter from the transponder 105 may have the wireless device 110 switch from a ring mode to a vibrate mode when the device 110 enters a conference room, theater, etc. In addition, the transponder 105 may send a control or context parameter within the answer signal 130 to have the wireless device 110 provide the user with information that is relevant to the context of the environment (e.g., a warning message about the environment in which the user is present). It will also be appreciated that if the transponder 105 sends a control or context parameter in the answer signal 130 directly to the wireless device 110, that the actual location of the wireless device 110 need not necessarily be determined.

Examples of the types of environment in which the location system 100 may be used and various scenarios involving the interaction between the wireless device 110, the transponders 105 of the location system 100, and the wireless communication network 150 are provided below. It will be appreciated, however, that these examples are provided merely to illustrate the application of the present invention. Accordingly, the present invention need not necessarily be limited to the examples presented below, but rather could be extended to various other environments and scenarios than those provided.

Referring back to the office building environment provided in FIG. 1B, the user of the wireless device 110 may have his or her office located in room E of the office building 115, for example. When the user enters his or her office in room E, the wireless device 110 transmits a trigger signal 125 to transponder 105(1) and receives an answer signal 130 therefrom including the identification 120 uniquely identifying transponder 105(1). The wireless device's processor 225 retrieves the location database 300 from memory 230 to look-up the corresponding transponder identification 120 and displays the location information 310 corresponding thereto on the wireless device 110. The database 300 also includes control information 320 corresponding to the transponder 105(1), that specifies for all incoming calls directed to the wireless device 110 should be forwarded to the user's landline office phone in room E. Accordingly, the wireless device 110 transmits a control signal to a location server 160 in the wireless communication network 150 that indicates the wireless device 110 is currently located within room E of the office building 115 and that all incoming calls to the wireless device 110 should be forwarded to the user's landline phone in room E. A message may then be displayed on the wireless device 110 to indicate to the user that all incoming calls will be forwarded to his office landline phone The control information 320 corresponding to the transponder 105(1) may further indicate to the wireless device 110 to adjust the time period for periodically transmitting the trigger signal 125 from every two minutes to every 10 minutes, for example. In another embodiment, it will be appreciated that the transponder 105(1) may transmit the location information and control parameters directly to the wireless device 110 in the answer signal 130 so that it need not look up or even store the information in the location database 300, thus conserving memory in the wireless device 110.

The user then exits his or her office E to attend a meeting in conference room A. The wireless device 110 transmits a trigger signal 125 and receives an answer signal 130 from transponder 105(2) in conference room A. Determining that the user is now located in conference room A, the wireless device 110 sends a control signal to the location server 160 of the wireless communication network 150 to cancel the forwarded incoming calls to the user's landline office phone in room E. The wireless device 110 further switches from a "ring" mode to a "vibrate" mode (so as not to disturb the other meeting attendees) in response to a control parameter sent from transponder 105(2) in conference room A. The location database 300 may also contain context information 315 that is associated with the transponder 105(2) of the conference room A. The context information 315 may, for example, take the form of a meeting agenda that is displayed to the user of the wireless device 110. The context information 315 stored within the location database 300 may be time sensitive such that the context information 315 is provided to the user during a certain period of time (or may be deleted from memory after the expiration of a certain time).

In another embodiment, the transponder 105(2) may also be configured to send a control parameter to the wireless device 110 to have it register the user with the location server 160 (via the wireless communication network 150) for the meeting that is being held in conference room A. Accordingly, the location server 160 may contact those meeting attendees not currently present in conference room A as a reminder that the meeting is now being held. This may be accomplished, for example, by having the operator of the location system 100 maintain a database at the location server 160 of the wireless communication network 150 (on a subscription basis). The operator of the location system 100 (e.g. the company that occupies the office building 115) may have previously downloaded the list of meeting attendees for a specific date, time and meeting room (e.g., conference room A) in which the meeting will be held. For those meeting attendees who have not registered with the location server 160 by a certain time (e.g., five minutes before the meeting commences) as a result of not being present in conference room A, the location server 160 may contact those absent attendees as a reminder of the meeting in conference room A.

In another example, the user of the wireless device 110 may enter a restaurant. The owner of the restaurant subscribes to a database server (not shown) at the location server 160 of the wireless communication network 150 for providing real-time services to its patrons. Upon the user entering the restaurant, the wireless device 110 transmits a trigger signal 125 to a transponder 105 (located at the entrance of the restaurant) and receives an answer signal 130 therefrom. A control parameter sent in the answer signal 130 directs the wireless device 110 to contact the restaurant's database server through the wireless communication network 150. (The control parameter may include an access code for authorizing access to the restaurant's database server.) The user is informed at the wireless device 110 by the restaurant's database server that there is currently a thirty minute wait for a table and prompts the user if he would like to be added to the waiting list for a table. The user then enters the number of people in his party on the wireless device 110 and this information is sent to the restaurant's database server. While the user is waiting for a table, the restaurant's server downloads a menu and a listing of today's specials being offered. The user may also be given the option to pre-order off the menu downloaded to the wireless device 110 to provide speedier service. The user makes his entrée selections through the wireless device 110 and forwards this information to the restaurant's server.

In the meantime, the restaurant's server may provide an update to the user of the wireless device 110 indicating how much time is remaining before a table becomes available. The user realizes that he can make a quick errand at a store next door to the restaurant before a table becomes available and leaves the restaurant. The wireless device 110 no longer detects the identification of the restaurant's transponder 105 in response to a periodically transmitted trigger signal 125 (as a result of the user being off the restaurant's premises). The wireless device 110 alerts the user to this fact and reminds the user that he is on a waiting list for a table at the restaurant and prompts the user if he desires to remain on the queue. A table becomes available for the user and the restaurant's server alerts the wireless device 110 through the wireless communication network 150 that a table is available and to approach the hostess podium to be seated.

It will be appreciated that the aforementioned examples are provided merely to illustrate the application of the present invention. Accordingly, the present invention need not necessarily be limited to the examples presented, but rather could be extended to various other environments and scenarios than those provided.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a wireless device operable in a wireless communication system, comprising:
   downloading a location database into the wireless device, wherein the location database comprises a plurality of transponder identifications, location information and control information;
   transmitting a first signal to a transponder, said transponder operating independent of said wireless communication system;
   receiving a second signal from the transponder, said second signal including identifying data associated with the transponder;
   determining a location of the wireless device within an environment or classifying the environment based at least in part upon the received identifying data, wherein determining the location of the wireless device is accomplished at the wireless device by using the location database;
   determining an action to perform based on the location of the wireless device by using the location database on the wireless device to access the control information for the transponder; and
   performing the action at the wireless device in response to the determined location of the wireless device.

2. The method of claim 1, wherein said determining a location of the wireless device further comprises:
   retrieving location data, defining the location within the environment, that is associated with the identifying data.

3. The method of claim 1, wherein said performing an action at the wireless device further comprises:
   displaying the location data at the wireless device.

4. The method of claim 1, wherein said performing an action at the wireless device further comprises:
   transmitting the location data of the wireless device to the wireless communication system.

5. The method of claim 1, wherein said performing an action at the wireless device further comprises:
   changing an operating mode or profile of the wireless device based upon the location data.

6. The method of claim 1, wherein said transmitting a first signal to a transponder further comprises transmitting a first signal to a radio frequency identification device (RFID).

7. The method of claim 1, wherein said receiving a second signal further comprises:
   receiving an identification of the transponder.

8. The method of claim 1, wherein said receiving a second signal further comprises:

receiving the control information from the transponder, the control information causing the wireless device to perform an action in accordance with the received control information.

9. An apparatus for a wireless device operable in a wireless communication system, comprising:
   means for downloading a location database into the wireless device, wherein the location database comprises a plurality of transponder identifications, location information and control information;
   means for transmitting a first signal to a transponder, said transponder operating independent of said wireless communication system;
   means for receiving a second signal from the transponder, said second signal including identifying data associated with the transponder;
   means for determining a location of the wireless device within an environment or classifying the environment based at least in part upon the received identifying data, wherein determining the location of the wireless device is accomplished at the wireless device by using the location database;
   means for determining an action to perform based on the location of the wireless device by using the location database on the wireless device to access the control information for the transponder; and
   means for performing the action at the wireless device in response to the determined location of the wireless device.

10. The apparatus of claim 9, wherein said means for determining a location of the wireless device further comprises:
    means for retrieving location data, defining the location within the environment, that is associated with the identifying data.

11. The apparatus of claim 9, wherein said means for performing an action at the wireless device further comprises:
    means for displaying the location data at the wireless device.

12. The apparatus of claim 9, wherein said means for performing an action at the wireless device further comprises:
    means for transmitting the location data of the wireless device to the wireless communication system.

13. The apparatus of claim 9, wherein said means for performing an action at the wireless device further comprises:
    means for changing an operating mode or profile of the wireless device based upon the location data.

14. The apparatus of claim 9, wherein said means for transmitting a first signal to a transponder further comprises means for transmitting a first signal to a radio frequency identification device (RFID).

15. The apparatus of claim 9, wherein said means for receiving a second signal further comprises:
    means for receiving an identification of the transponder.

16. The apparatus of claim 9, wherein said means for receiving a second signal further comprises:
    means for receiving the control information from the transponder, the control information causing the wireless device to perform an action in accordance with the received control information.

17. A wireless device operable in a wireless communication system, comprising:
    a transmitter for transmitting a first signal to a transponder, said transponder operating independent of said wireless communication system;
    a receiver for receiving a second signal from the transponder, said second signal including identifying data associated with the transponder; and
    a processor for:
        downloading a location database into the wireless device, wherein the location database comprises a plurality of transponder identifications, location information and control information;
        determining a location of the wireless device within an environment or classifying the environment based at least in part upon the received identifying data, wherein determining the location of the wireless device is accomplished at the wireless device by using the location database;
        determining an action to perform based on the location of the wireless device by using the location database on the wireless device to access the control information for the transponder; and
        performing the action at the wireless device in response to the determined location of the wireless device.

18. The wireless device of claim 17, wherein said processor retrieves location data, defining the location within the environment, that is associated with the identifying data.

19. The wireless device of claim 17, wherein said action performed includes displaying the location data at the wireless device.

20. The wireless device of claim 17, wherein said transmitter transmits the location data of the wireless device to the wireless communication system.

21. The wireless device of claim 17, wherein said processor changes an operating mode or profile of the wireless device based upon the location determined.

22. The wireless device of claim 17, wherein the transponder comprises a radio frequency identification device (RFID).

23. The wireless device of claim 17, wherein said identifying data comprises an identification of the transponder.

24. The wireless device of claim 17, wherein said receiver receives the control information from the transponder, the control information causing the processor to perform an action in accordance with the received control information.

25. A computer-readable storage medium programmed with a set of instructions that perform a method, comprising:
    downloading a location database into a wireless device, wherein the location database comprises a plurality of transponder identifications, location information and control information:
    transmitting a first signal from the wireless device operable in a wireless communication system to a transponder, said transponder operating independent of said wireless communication system;
    receiving a second signal at the wireless device from the transponder, said second signal including identifying data associated with the transponder;
    determining a location of the wireless device within an environment or classifying the environment based at least in part upon the received identifying data, wherein determining the location of the wireless device is accomplished at the wireless device by using the location database;
    determining an action to perform based on the location of the wireless device by using the location database on the wireless device to access the control information for the transponder; and
    performing the action at the wireless device in response to the determined location of the wireless device.

26. The computer-readable storage medium of claim 25, wherein said determining a location of the wireless device further comprises:

retrieving location data, defining the location within the environment, that is associated with the identifying data.

27. The computer-readable storage medium of claim 25, wherein said performing an action at the wireless device further comprises:

displaying the location data at the wireless device.

28. The computer-readable storage medium of claim 25, wherein said performing an action at the wireless device further comprises:

transmitting the location data of the wireless device to the wireless communication system.

29. The computer-readable storage medium of claim 25, wherein said performing an action at the wireless device further comprises:

changing an operating mode or profile of the wireless device based upon the location data.

30. The computer-readable storage medium of claim 25, wherein said transmitting a first signal to a transponder further comprises transmitting a first signal to a radio frequency identification device (RFID).

31. The computer-readable storage medium of claim 25, wherein said receiving a second signal further comprises:

receiving an identification of the transponder.

32. The computer-readable storage medium of claim 25, wherein said receiving a second signal further comprises:

receiving the control information from the transponder, the control information causing the wireless device to perform an action in accordance with the control information.

33. A wireless device operable in a wireless communication system, comprising:

means for downloading a location database into the wireless device, wherein the location database comprises a plurality of transponder identifications, location information and control information;

means for transmitting a first signal to a transponder, said transponder operating independent of said wireless communication system;

means for receiving a second signal from the transponder, said second signal including identifying data associated with the transponder;

means for determining a location of the wireless device within an environment or classifying the environment based at least in part upon the received identifying data, wherein determining the location of the wireless device is accomplished at the wireless device by using the location database;

means for determining an action to perform based on the location of the wireless device by using the location database on the wireless device to access the control information for the transponder; and means for performing the action at the wireless device in response to the determined location of the wireless device.

* * * * *